United States Patent
Rengert

(10) Patent No.: US 11,659,079 B2
(45) Date of Patent: May 23, 2023

(54) ROBUST ULE VOICE BROADCAST

(71) Applicant: DSP Group Ltd., Herzliya (IL)

(72) Inventor: Otmar Rengert, Nuemberg (DE)

(73) Assignee: DSP Group Ltd., Herzliya (IL)

( * ) Notice: Subject to any disclaimer, the term of this patent is extended or adjusted under 35 U.S.C. 154(b) by 0 days.

(21) Appl. No.: 16/862,514

(22) Filed: Apr. 29, 2020

(65) Prior Publication Data

US 2020/0351397 A1     Nov. 5, 2020

Related U.S. Application Data

(60) Provisional application No. 62/841,397, filed on May 1, 2019.

(51) Int. Cl.
| | |
|---|---|
| *H04M 1/72502* | (2021.01) |
| *H04M 1/253* | (2006.01) |
| *H04W 88/02* | (2009.01) |
| *H04H 60/27* | (2008.01) |

(52) U.S. Cl.
CPC ........ *H04M 1/72502* (2013.01); *H04H 60/27* (2013.01); *H04M 1/2535* (2013.01); *H04W 88/02* (2013.01); *H04M 2250/08* (2013.01)

(58) Field of Classification Search
CPC ..... H04W 88/02; H04W 12/79; H04W 4/027; H04W 4/14; H04W 64/003; H04W 12/37; H04W 28/20; H04W 48/20; H04W 4/021; H04W 80/10; H04W 84/12; H04W 36/165; H04W 4/18; H04W 4/20; H04W 4/50; H04W 92/18; H04L 27/2071; H04L 27/2602; H04L 5/1453; H04L 5/0082; H04L 5/0094; H04L 65/608; H04L 65/1066; H04L 65/1069; H04L 65/403; H04L 65/4076; H04M 11/04; H04M 1/725; H04M 1/72415; H04M 1/2535; H04M 1/72502; H04M 2203/4509; H04M 2207/20; H04M 2242/30; H04M 2250/08; H04M 3/382; H04M 3/5307; H04M 1/2757; H04M 1/6066; H04M 1/642; H04M 1/658; H04M 1/67; H04M 1/72412; H04M 1/72433; H04H 60/27
See application file for complete search history.

(56) References Cited

U.S. PATENT DOCUMENTS

| | | | |
|---|---|---|---|
| 2005/0213748 A1* | 9/2005 | Messerschmidt | H04B 3/234 379/406.08 |
| 2012/0202484 A1* | 8/2012 | Dickinson | H04W 16/14 455/426.1 |
| 2018/0026703 A1* | 1/2018 | Bhargava | H04W 40/12 370/315 |

* cited by examiner

*Primary Examiner* — Srilakshmi K Kumar
*Assistant Examiner* — Jing Gao
(74) *Attorney, Agent, or Firm* — Leydig, Voit & Mayer, Ltd.

(57) ABSTRACT

A method for receiving audio broadcasts during a digital enhanced cordless telecommunication (DECT) frame, the method may include (a) opening, during a DECT frame and by a portable point (PP) that is a potential recipient of the audio broadcasts from a fixed part (FP), multiple reception windows that are spaced apart from each other and are allocated to receive signals related to audio broadcast; (b) receiving received signals, by the PP and during the multiple spaced apart reception windows; and (c) processing, by the PP, the received signals.

20 Claims, 7 Drawing Sheets

Broadcasting, within the DECT frame, audio signals during multiple spaced apart transmission windows, to multiple portable points (PP) that may be potential recipients of the audio signals. 510

ROBUST ULE VOICE BROADCAST

CROSS REFERENCE

This application claims priority from U.S. provisional patent 62/841,397 filing date May 1, 2019.

BACKGROUND OF THE INVENTION

A digital enhanced cordless telecommunication (DECT) frame is ten millisecond long and includes multiple slots—(a) twelve down slots (transmission from a base terminal such as a fixed part (FP) to portable parts (PPs)), that are followed by (b) twelve up slots (transmissions from PPs to FP).

The FP may broadcast audio to the PP one per frame—which introduces a ten millisecond delay between one audio broadcast event to another.

FIG. 1 illustrates a first DECT frame 10 (including twenty four slots 100-123) and a part (including slots 200-207) of a second DECT frame 20. Second DECT frame 20 includes twenty four slots—but only eights slots (200-207) are illustrated for convenience of explanation. The second DECT frame includes twenty four slots.

The FP transmits a beacon (denoted TxBC) at the fourth slot of each DECT frame (103 and 203, respectively) and broadcasts audio at the seventh slot of each DECT frame (106 and 206, respectively).

Data embedded in the broadcasted audio is sent to an audio decoder for decoding (denoted DA) in the eighth slot of each DECT frame (107 and 207 respectively). When using a frame of ten millisecond duration, the delay between the audio broadcast events is ten milliseconds.

There is a growing need to reduce the delay between audio broadcast events.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is an example of a method.

DETAILED DESCRIPTION OF THE DRAWINGS

Figure 1:
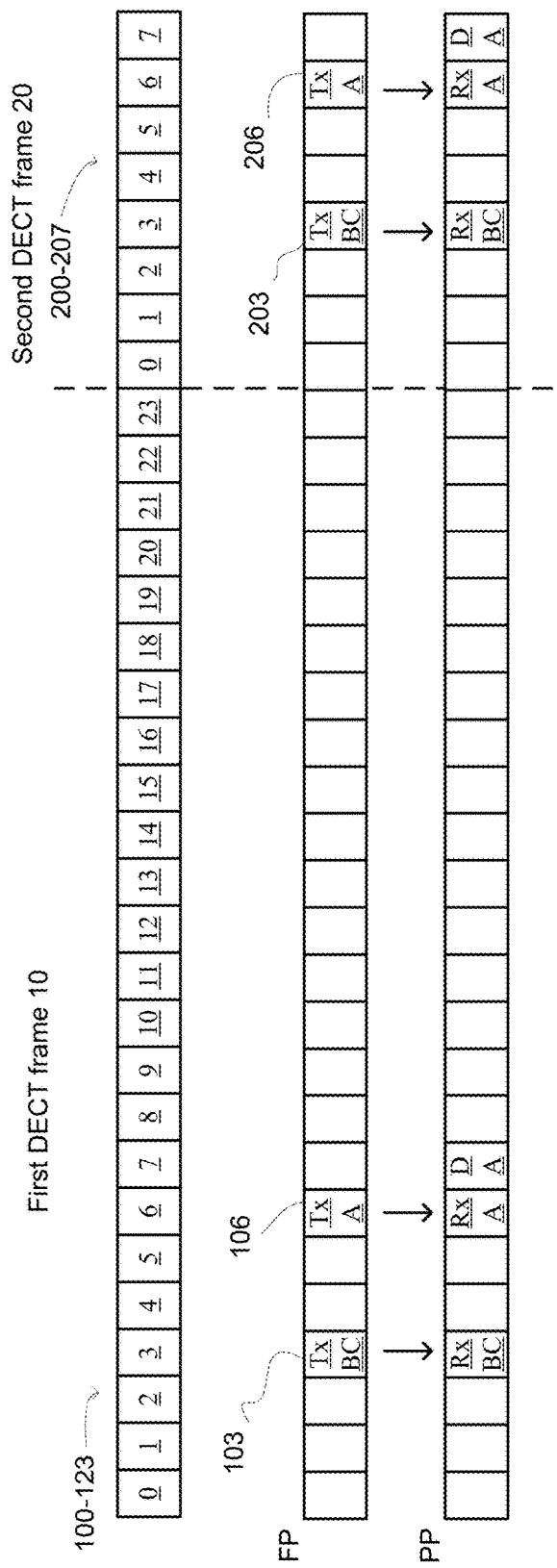
FIG. 1 illustrates a prior art timing diagram.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In various figures a DECT frame is illustrated as including slots.

Assuming, for example, that a reception window and a transmission window are one slot long.

Under this assumption: (a) a slot that is used by the PP for reception is regarded as a reception window (of the PP), (b) a slot that is used by the PP for transmission is regarded as a transmission window (of the PP), (c) a slot that is used by the FP for reception is regarded as a reception window (of the FP), and (d) a slot that is used by the FP for transmission is regarded as a transmission window (of the FP).

The terms slot, reception window and transmission window are used in an interchangeable manner.

Figure 2:
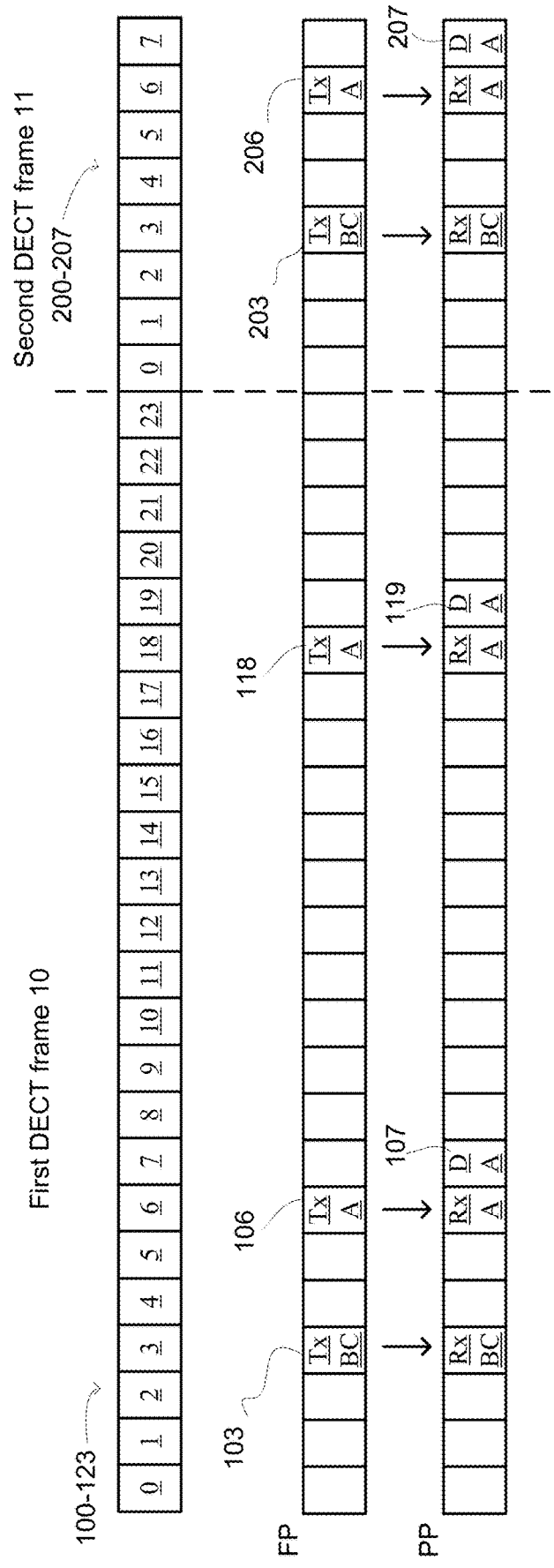
FIG. 2 illustrates an example of a timing diagram.
Figure 3:
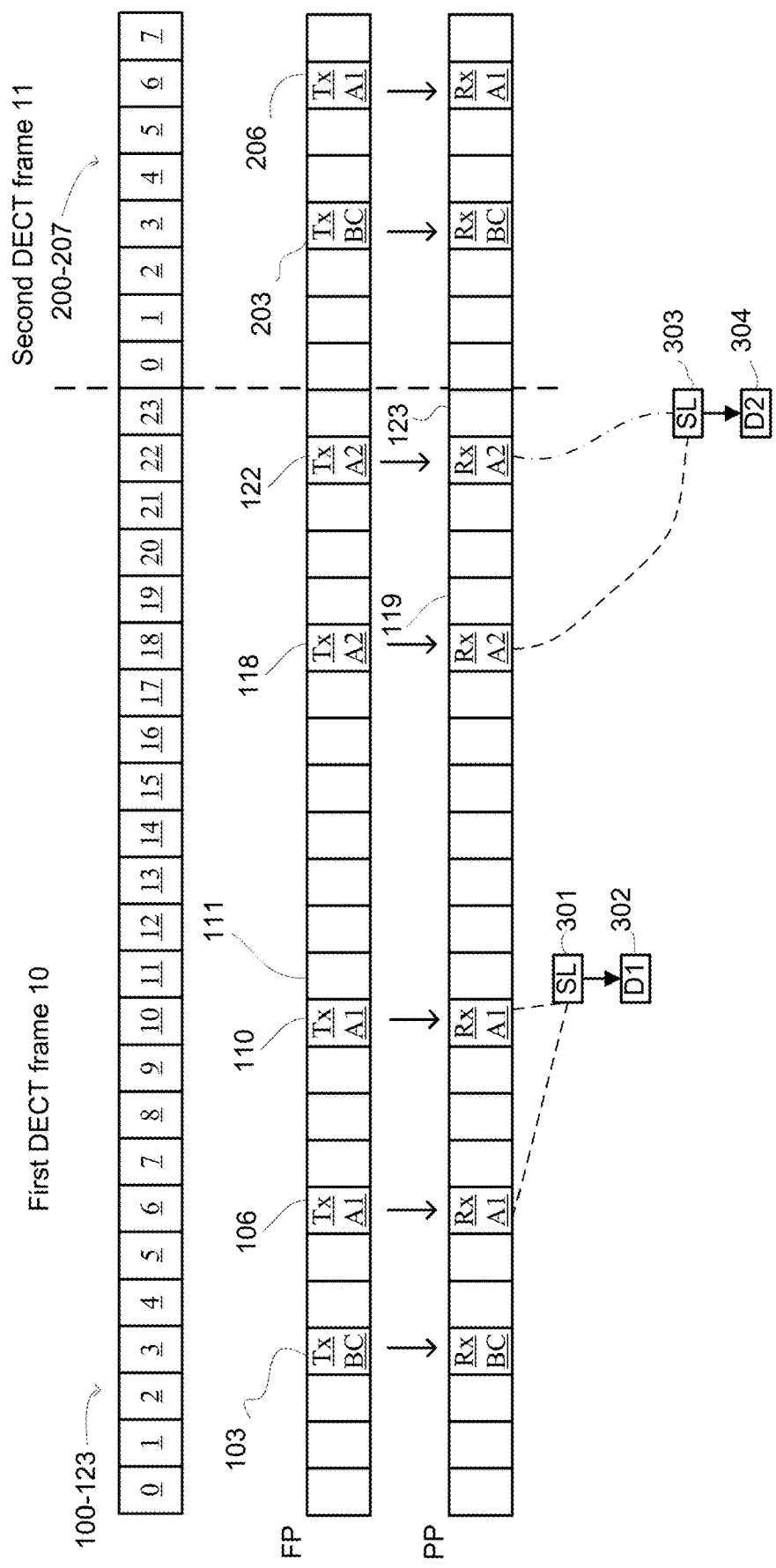
FIG. 3 illustrates an example of a timing diagram.
Figure 4:
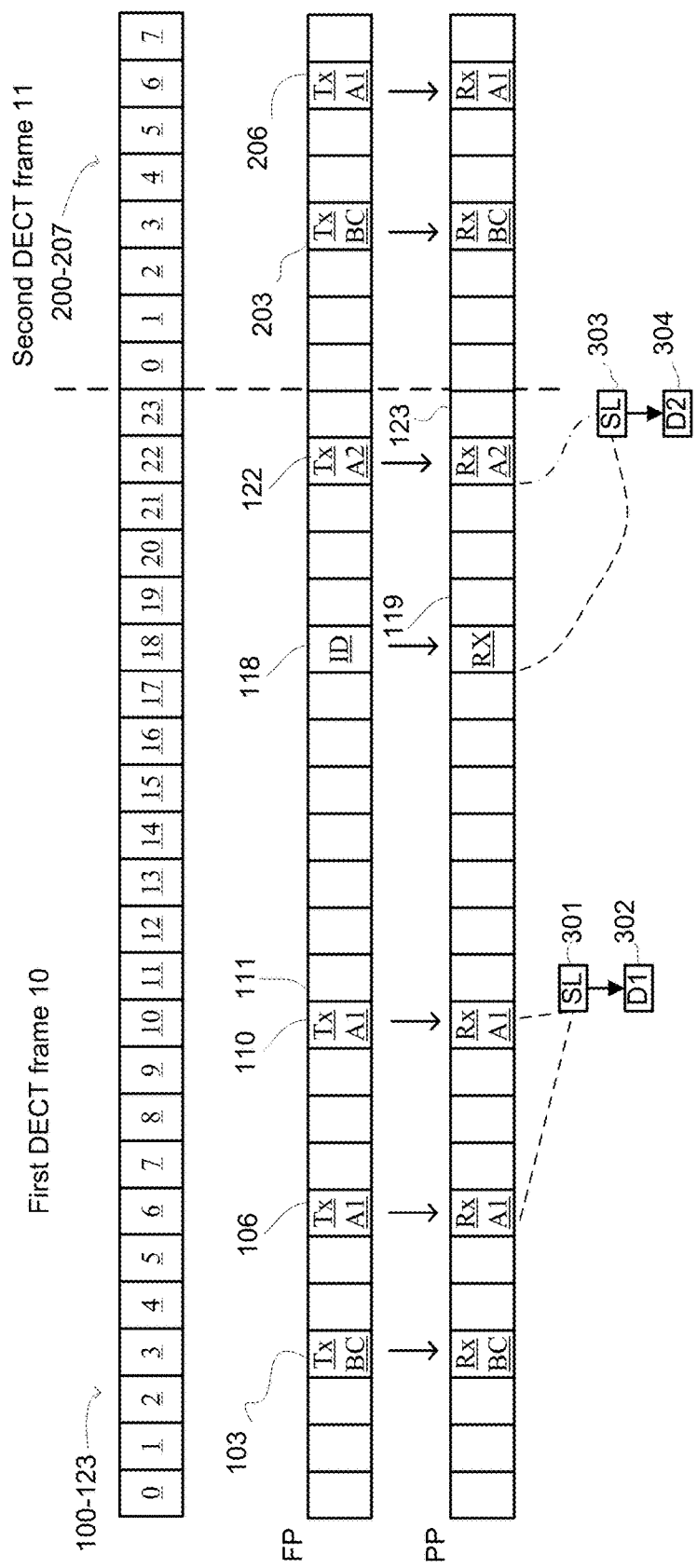
FIG. 4 illustrates an example of a timing diagram.

In FIGS. 2-4—
a. BC stands for beacon.
b. A transmission of a beacon is denoted TxBC.
c. A reception of a beacon is denoted RxBC.
d. A, A1 and A2 stand for audio content that is being broadcasted by the FP. A1 is a
first content that differs from A2.
e. A transmission of A, A1 or A2 is denoted TxA, TxA1, and TxA2 respectively.
f. A reception of A, A1 or A2 is denoted RxA, RxA1, and RxA2 respectively.
g. Decoding of A, A1 or A2 is denoted DA, D1 302 and D2 304, respectively.
h. A selection of a reception frame (or of signals received during two or more slots) is denoted SL 301 and SL 303.
i. IC denoted interference detection.

FIG. 2 illustrates a timing diagram in which there are multiple broadcast transmissions per a single DECT frame (for example—carrying fragments of the same audio stream) to reduce audio delay. The time difference between the broadcast transmissions is smaller in relation to prior art delay period (for example five milliseconds versus ten milliseconds).

This can be extended to more broadcast bearers to reduce delay further.

FIG. 2 illustrates a first DECT frame 10 and a part of a second DECT frame 20.

Because only part of the second DECT frame is illustrated—some of the slots mentioned in the following text do not appear in FIGS. 2-4—and are not associated with reference numbers.

The FP transmits a beacon at the fourth slot of each DECT frame (103 and 203, respectively) and broadcasts audio at the seventh slots and the nineteenth slots of each DECT frame (106 and 118, as well as 206).

Data embedded in the broadcasted audio is sent to an audio decoder in the eighth slot and twenty slot of each DECT frame (107 and 119 and 207 respectively). When using a frame of ten millisecond duration, the delay between the audio broadcast events is five milliseconds.

The content of audio broadcasted during the seventh slot may be the same (or may differ) from the content of audio broadcasted during the nineteenth slot.

FIG. 3 is a time diagram the illustrated how add redundancy and reduce delay.

This allows to increase reliability by adding slot and frequency diversity of broadcast bearers.

FIG. 3 illustrates a first DECT frame 10 and a part of a second DECT frame 20.

The FP transmits a beacon (denoted TxBC) at the fourth slot of each DECT frame (103 and 203, respectively), broadcasts audio (of a first content A1) at the seventh slot and the eleventh slot of each DECT frame (106 and 110, as well as 206), and broadcasts audio (of a second content A2) at the nineteenth slot and the twenty third slots of each DECT frame (118 and 122).

During the twelve slot 111, the PP performs a first selection (see first selection box SL 301) between audio signals (first content A1) broadcasted during slots 106 and 110, and also decodes (see first decoding box D1 302) the selected audio signals. Slots 106 and 110 may use different carrier signals.

During the twenty fourth slot 123, the PP performs a second selection (see second selection box SL 303) between audio signals (second content A2) broadcasted during slots 118 and 122, and also decodes (see second decoding box D2 304) of the selected audio signals. Slots 118 and 122 may use different carrier signals.

FIG. 4 is timing diagram that includes interference detection (IC) and a selection of audio signals (between two slots) based on the outcome of the interference detection.

The interference detection is executed by the FP that does not broadcast during nineteenth slot (118) and receive signals that may be regarded as an interference. The FP may measure whether any foreign system is using the same slot and carrier (by RSSI).

The timing diagram of FIG. 4 equals the timing diagram of FIG. 3—except the following:
a. The nineteenth slot 118 is used by the FP for interference detection—no audio is broadcasted by the FP, and any signals received by the FP are used to detect interference.
b. The PP does not receive the audio broadcast during nineteenth slot—but receives(denoted RX) various signals that may be interference signals.

The suggested interference detection is beneficial as in broadcast systems, there is no return channel where PPs could indicate they have problems receiving.

Interference detection that is based on an absence of broadcast certain audio content during the entire DECT frame is problematic (for example when implementing the prior art scheme of FIG. 1)—because in voice broadcast systems, this would cause clicks (due to lack of any broadcast of the certain audio content during an entire DECT frame) in the PP.

The scheme illustrated in FIG. 4, and the broadcast of the same content at least once per DECT frame (for example the transmission of A1 during slot 106) guarantees that there is no click- and the PP may recover the audio content of A1.

The scheme illustrated in FIG. 4 may also be used to escape from interference. Escape from interference for broadcast bearers typically means to set up a new broadcast bearer on a new slot and carrier (which takes some time), and once it is there to release the old bearer.

During the time to establish the new bearer, the PP in a traditional DECT system will typically suffer from audio interruption/noise, as the old bearer is interfered.

Having robustness the audio in the PP would remain intact, as it can still receive from the persistent duplicated bearer.

Figure 5:
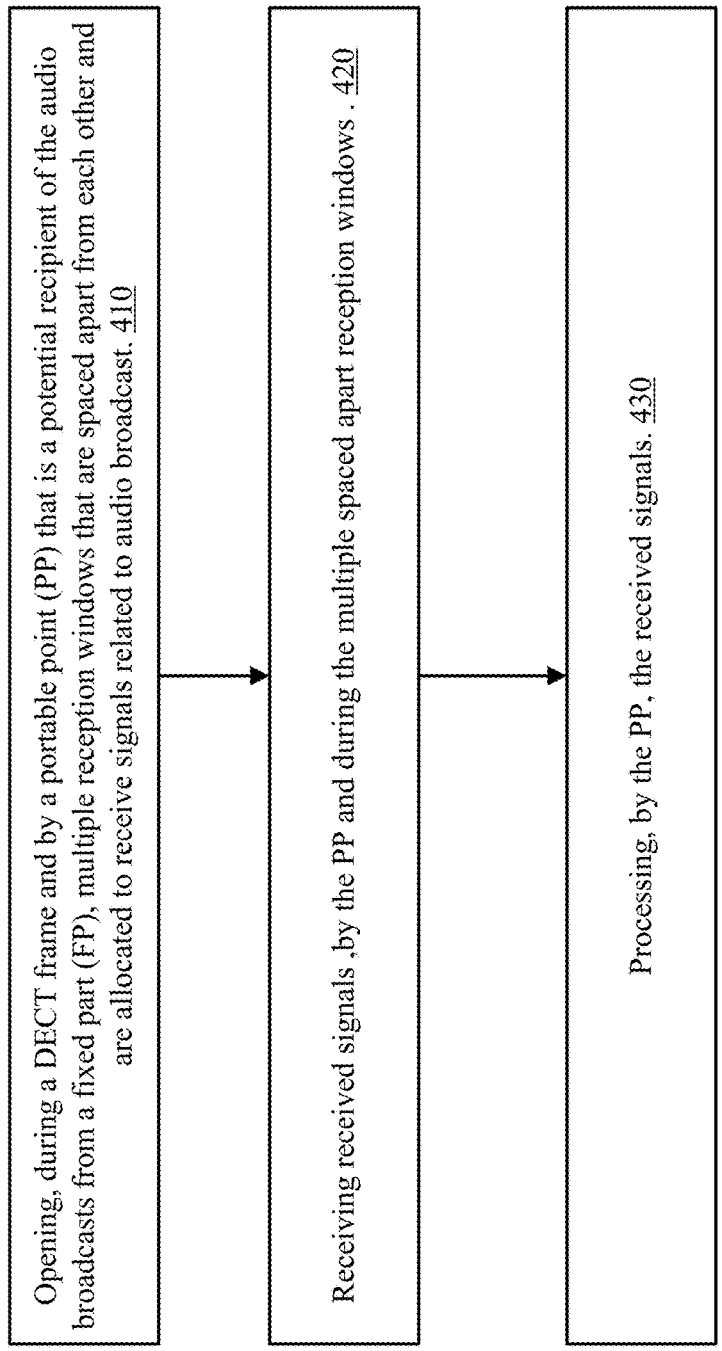
FIG. 5 is an example of a method.

FIG. 5 illustrates method 400 for receiving audio broadcasts during a digital enhanced cordless telecommunication (DECT) frame.

Method 400 may start by step 410 of opening, during a DECT frame and by a portable point (PP) that is a potential recipient of the audio broadcasts from a fixed part (FP), multiple reception windows that are spaced apart from each other and are allocated to receive signals related to audio broadcast.

Each reception window may be one DECT frame slot long. Different DECT slots may be associated with different carriers. The different carriers may differ from each other by frequency.

Step 410 may be followed by step 420 of receiving received signals, by the PP and during the multiple spaced apart reception windows.

Step 420 may be followed by step 430 of processing, by the PP, the received signals. The processing may include, for example, selecting which signals to decode, decoding the audio signals, performing interference testing, and the like.

At least two reception windows of the multiple reception windows may be allocated for receiving audio broadcast signals transmitted during different audio broadcast events. For example—see slots 106 and 118 of FIG. 2, slots 106, 110, 118, 122 and 206 of FIG. 3, and slots 106, 110, 122 and 206 of FIG. 4.

At least two slots of the of the multiple slots may be allocated for receiving same audio broadcast signals. See, slots 106 and 110 of FIG. 3, slots 118 and 122 of FIG. 3, and slots 106 and 110 of FIG. 4.

Step 430 may include selecting, by the PP, a slot out of the at least two slots, decoding audio broadcast signals of the selected slot, and preventing from decoding audio broadcast signals of a non-selected slot. See, for example, (i) first selection box SL 301 of FIG. 4 for selecting between audio signals broadcasted during slots 106 and 110, (ii) first decoding box D1 302 of FIG. 3 that follows SL 301, (iii) second selection box SL 303 of FIG. 3 for selecting between audio signals broadcasted during slots 118 and 122, (iv) second decoding box D2 304 of FIG. 3 that follows SL 303, (v) second selection box SL 303 of FIG. 4 for selecting between audio signals broadcasted during slots 118 and 122, wherein the selection is based on an outcome ("SEL 305") of the interference testing of slot 119, (iv) second decoding box D2 304 of FIG. 5 that follows SL 303.

The multiple slots may include (a) a first group of slots that comprises first slots (for example, slots 106 and 110 of FIGS. 3 and 4) and (b) a second group of slots that comprises second slots (for example, slots 118 and 122 of FIG. 3).

In FIG. 3, each one of the first slots is allocated for receiving a first audio content (denoted A1 in FIG. 3). Each one of the second slots is allocated for receiving a second audio content (denoted A2) that differs from the first audio content.

The processing may include (a) selecting, by the PP, a first slot of the first slots (for example SL 301 of FIG. 3), (b) selecting, by the PP, a second slot of the second slots (for example SL 303 of FIGS. 3 and 4), (c) decoding the broadcast audio signals of the selected first slot (for example D1 302 of FIG. 3), (d) decoding the broadcast audio signals of the selected second slot (for example D2 303 of FIGS. 3 and 4), and (e) preventing from decoding a broadcast audio signals of a non-selected first slot and of a non-selected second slot.

FIG. 6 illustrates method 500.

Method 500 is for broadcasting audio signals during a digital enhanced cordless telecommunication (DECT) frame.

Method 500 may include step 510 of broadcasting, within the DECT frame, audio signals during multiple spaced apart transmission windows, to multiple portable points (PP) that may be potential recipients of the audio signals.

At least two transmission windows of the of the multiple transmission windows may be allocated for transmitting same audio broadcast content.

The multiple transmission windows may include (a) a first group of transmission windows that may include first transmission windows, and (b) a second group of transmission windows that may include second transmission windows.

Each one of the first transmission windows may be allocated for transmitting a first audio content; each one of the second transmission windows may be allocated for transmitting a second audio content that differs from the first audio content.

At least one transmission window may be allocated for interference testing. During this transmission window the FP does not broadcast audio but rather receives signals and determines whether it is an interference.

Each one or method 400 and 500 may include allocating reception windows and/or transmission windows.

Methods 400 and 500 may be used in various scenarios—for example in scenarios where the audio broadcast is more important that reception of transmissions from PP to FP. For example—when information sensed by one sensor (PP) is sent to a base station (FP) and should be broadcasted to other sensors (and probably may cause the other sensors to generate an audio alert)—for example when a fire sensors senses a fire in one room other sensors of a network may be induces to generate an audio alert about the detection of the fire.

Any slot not allocated in any of the timing diagrams may be used for reception and/or transmission.

Figure 7:
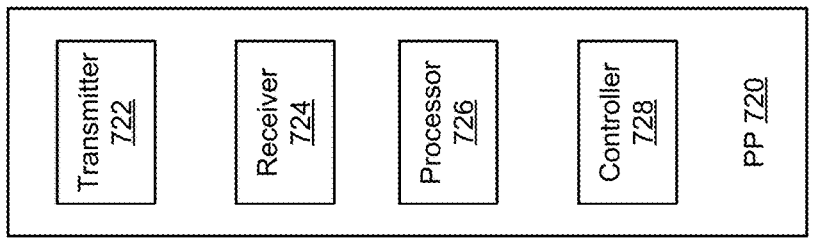
FIG. 7 is an example of a fixed part and of a portable part.
Figure 7:
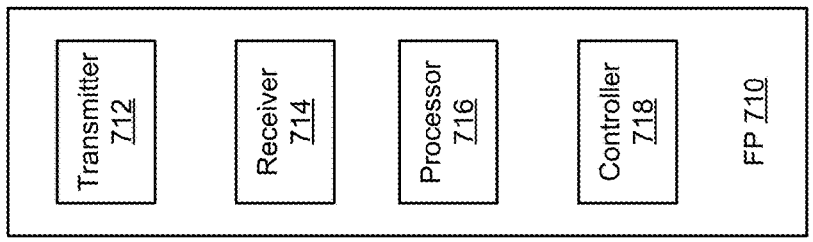

FIG. 7 illustrates a FP 710 and a PP 720.

FP 710 and PP 720 may be DECT compliant.

FP 710 may include a transmitter 712 that is configured to broadcast, within the DECT frame, audio signals during multiple spaced apart transmission windows, to multiple PPs that are potential recipients of the audio signals PP 720 may include a receiver 724 that is configured to: (a) open, during a DECT frame, multiple reception windows that are spaced apart from each other and are allocated to receive signals related to audio broadcast; (b) receive received signals, by the PP and during the multiple spaced apart reception windows; and (c) process the received signals.

The FP 710 may also include a receiver 714 for receiving transmissions from the PP, a processor 716 for processing signals from the PP, and a controller 718 for controlling the FP.

The PP 720 may also include a transmitter 722 for transmitting to the FP, a processor 726 for processing signals from the FP, and a controller 728 for controlling the PP. The processor may include the decoder and/or a selector for selecting between audio signals received during different slots.

The mentioned above methods, systems and non-transitory computer readable medium may be applied mutatis mutandis to time division multiplexing access (TDMA) communication protocols.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for receiving audio broadcasts from a fixed part (FP) during a digital enhanced cordless telecommunication (DECT) frame, the method comprises:
    opening, during the DECT frame by a portable point (PP), multiple reception windows that are spaced apart from each other and are allocated to receive audio broadcast signals of the audio broadcasts, wherein the DECT frame comprises a single set of consecutive down slots followed by a single set of consecutive up slots and the audio broadcast signals of the audio broadcasts differ from a FP beacon;
    receiving the audio broadcast signals, by the PP during the multiple reception windows of the DECT frame, wherein the audio broadcast signals comprise a first audio broadcast signal having a first carrier and a second audio broadcast signal having a second carrier with a different frequency than the first carrier, the first audio broadcast signal and the second audio broadcast signal having a same content;
    selecting, by the PP, the first audio broadcast signal or the second audio broadcast signal in a reception window out of a first set of reception windows of the multiple reception windows, based on an outcome of an interference testing, to provide a first selected reception window; and
    processing, by the PP, the selected first audio broadcast signal or second audio broadcast signal of the first selected reception window.

2. The method according to claim 1 wherein at least two reception windows of the multiple reception windows are allocated for receiving audio broadcast signals transmitted during different audio broadcast events.

3. The method according to claim 1 wherein at least two reception windows of a second set of reception windows of the multiple reception windows are allocated for receiving same audio broadcast signals.

4. The method according to claim 3 comprising:
    selecting, by the PP, a reception window out of the at least two reception windows, to provide a second selected reception window;
    decoding received audio broadcast signals of the second selected reception window; and
    preventing from decoding audio broadcast signals of a non-selected reception window.

5. The method according to claim 1 wherein the multiple reception windows comprises (a) a first group of reception windows that comprises first reception windows, and (b) a second group of reception windows that comprises second reception windows.

6. The method according to claim 5 wherein each one of the first reception windows is allocated for receiving a first audio content; wherein each one of the second reception windows is allocated for receiving a second audio content that differs from the first audio content.

7. The method according to claim 6 comprising (a) selecting, by the PP, a first reception window of the first reception windows, (b) selecting, by the PP, a second reception window of the second reception windows, (c) decoding the broadcast audio signals of the selected first reception window, (d) decoding the broadcast audio signals of the selected second reception window, and (e) preventing from decoding a broadcast audio signals of a non-selected first reception window and of a non-selected second reception window.

8. The method according to claim 1, wherein a delay between consecutive transmission windows of the multiple reception windows does not exceed a length of the single set of consecutive down slots.

9. The method according to claim 1, wherein a delay between consecutive transmission windows of the multiple reception windows does not exceed five milliseconds.

10. The method according to claim 1, wherein the interference testing is executed by the FP.

11. The method according to claim 1, wherein the interference testing is executed by the PP.

12. A non-transitory computer readable medium that stores instructions for:
    opening, during a digital enhanced cordless telecommunication (DECT) frame by a portable point (PP), multiple reception windows that are spaced apart from each other and are allocated to receive audio broadcast signals of audio broadcasts, wherein the DECT frame comprises a single set of consecutive down slots followed by a single set of consecutive up slots and the audio broadcast signals of the audio broadcasts differ from a fixed part (FP) beacon;
    receiving the audio broadcast signals, by the PP, during the multiple reception windows of the DECT frame, wherein the audio broadcast signals comprise a first audio broadcast signal having a first carrier and a second audio broadcast signal having a second carrier with a different frequency than the first carrier, the first audio broadcast signal and the second audio broadcast signal having a same content;
    selecting, by the PP, the first audio broadcast signal or the second audio broadcast signal in a reception window out of a first set of reception windows, based on an outcome of an interference testing, to provide a first selected reception window;
    and processing, by the PP, the selected first audio broadcast signal or second audio broadcast signal of the first selected reception window.

13. The non-transitory computer readable medium according to claim 12 wherein at least two reception windows of the multiple reception windows are allocated for receiving audio broadcast signals transmitted during different audio broadcast events.

14. A digital enhanced cordless telecommunication (DECT) compliant portable point (PP), the DECT compliant PP comprising:
    a receiver that is configured to:
        open, during a digital enhanced cordless telecommunication (DECT) frame by the PP, multiple reception windows that are spaced apart from each other and are allocated to receive audio broadcast signals of audio broadcasts, wherein the DECT frame comprises a single set of consecutive down slots followed by a single set of consecutive up slots and the audio broadcast signals of the audio broadcasts differ from a fixed part (FP) beacon;

receive the audio broadcast signals, by the PP, during the multiple spaced apart reception windows of the DECT frame, wherein the audio broadcast signals comprise a first audio broadcast signal having a first carrier and a second audio broadcast signal having a second carrier with a different frequency than the first carrier, the first audio broadcast signal and the second audio broadcast signal having a same content;

select, by the PP, the first audio broadcast signal or the second audio broadcast signal in a reception window out of a first set of reception windows, based on an outcome of an interference testing, to provide a first selected reception window; and process, by the PP, the selected first audio broadcast signal or second audio broadcast signal of the first selected reception window.

15. A method for audio broadcasting during a digital enhanced cordless telecommunication (DECT) frame, the method comprises:

broadcasting, within the DECT frame, by a fixed part (FP), audio broadcast signals during two or more transmission windows of multiple transmission windows that are spaced apart from each other, to multiple portable points (PPs), wherein the DECT frame comprises a single set of consecutive down slots followed by a single set of consecutive up slots and the audio broadcast signals of audio broadcasts differ from a FP beacon, wherein the audio broadcast signals of the DECT frame comprise a first audio broadcast signal having a first carrier and a second audio broadcast signal having a second carrier with a different frequency than the first carrier, the first audio broadcast signal and the second audio broadcast signal having a same content;

performing, by the FP and without transmitting, interference testing during another transmission window of the multiple transmission windows; and transmitting an outcome of the interference testing to the multiple PPs.

16. The method according to claim 15 wherein at least two transmission windows of the two or more transmission windows are allocated for transmitting same audio broadcast content.

17. The method according to claim 15 wherein the two or more transmission windows comprise (a) a first group of transmission windows that comprises first transmission windows, and (b) a second group of transmission windows that comprises second transmission windows.

18. The method according to claim 17 wherein each one of the first transmission windows is allocated for transmitting a first audio content; wherein each one of the second transmission windows is allocated for transmitting a second audio content that differs from the first audio content.

19. A non-transitory computer readable medium that stores instructions for:

broadcasting, by a fixed part (FP) and within a digital enhanced cordless telecommunication (DECT) frame, audio broadcast signals during two or more transmission windows of multiple transmission windows that are spaced apart from each other, to multiple portable points (PPs), wherein the DECT frame comprises a single set of consecutive down slots followed by a single set of consecutive up slots and wherein the audio broadcast signals of audio broadcasts differ from a FP beacon, wherein the audio broadcast signals of the DECT frame comprise a first audio broadcast signal having a first carrier and a second audio broadcast signal having a second carrier with a different frequency than the first carrier, the first audio broadcast signal and the second audio broadcast signal having a same content;

performing, by the FP and without transmitting, interference testing during another transmission window of the multiple transmission windows; and sending an outcome of the interference testing to the multiple PPs.

20. A digital enhanced cordless telecommunication (DECT) compliant fixed part (FP), the DECT compliant FP comprising:

a transmitter that is configured to broadcast, within a DECT frame, audio broadcast signals during two or more transmission windows of multiple transmission windows that are spaced apart from each other, to multiple portable points (PPs), wherein the DECT frame comprises a single set of consecutive down slots followed by a single set of consecutive up slots and the audio broadcast signals of audio broadcasts differ from a FP beacon, wherein the audio broadcast signals of the DECT frame comprise a first audio broadcast signal having a first carrier and a second audio broadcast signal having a second carrier with a different frequency than the first carrier, the first audio broadcast signal and the second audio broadcast signal having a same content, wherein the DECT compliant FP is further configured to perform, without transmitting, interference testing during another transmission window of the multiple transmission windows, and wherein the transmitter is further configured to transmit an outcome of the interference testing to the multiple PPs.

* * * * *